Dec. 30, 1930.  R. KEMLEIN  1,787,203
COUPLING DEVICE
Filed July 11, 1928
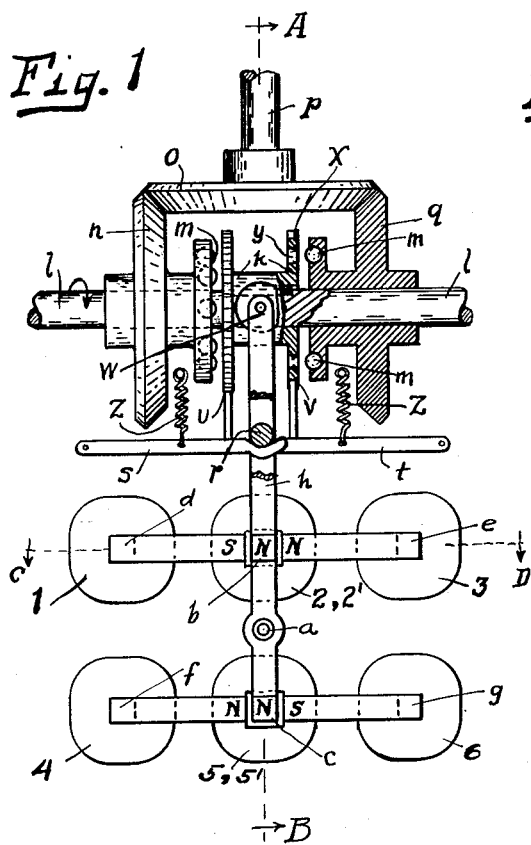
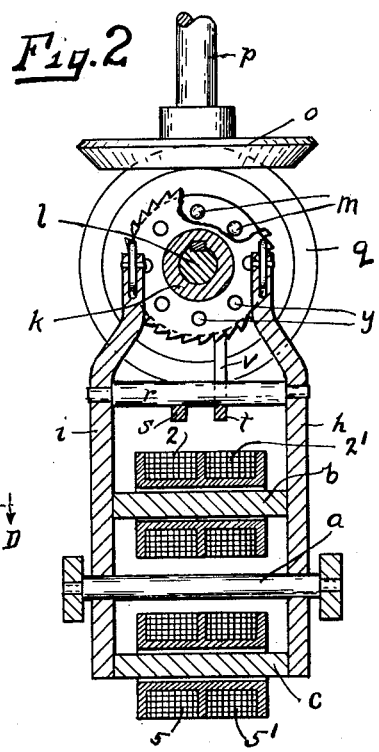
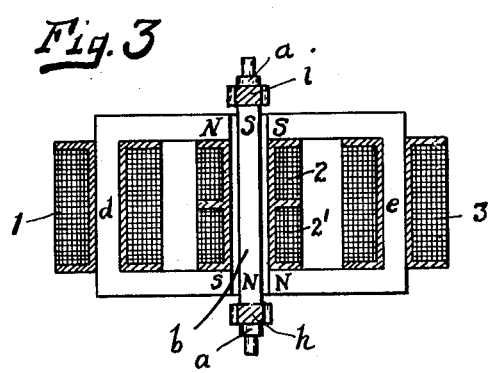
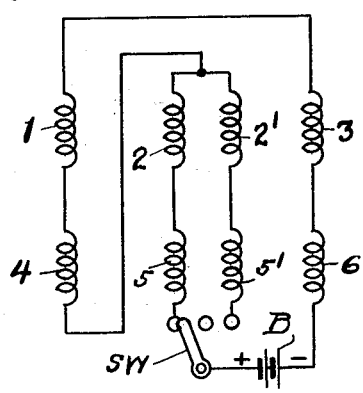
INVENTOR
Richard Kemlein
BY Samuel Ostrolenk
ATTORNEY Patented Dec. 30, 1930

1,787,203

UNITED STATES PATENT OFFICE

RICHARD KEMLEIN, OF BERLIN, GERMANY, ASSIGNOR TO C. LORENZ AKTIENGESELLSCHAFT, OF BERLIN-TEMPELHOF, GERMANY

COUPLING DEVICE

Application filed July 11, 1928, Serial No. 291,836, and in Germany May 4, 1927.

This invention relates to a coupling device for transferring rotary motion from a driving shaft to a driven shaft.

One object of my invention is to provide coupling means whereby rapid changes of the coupling connection between two shafts may be effected.

Another object of my invention is to provide an electro-magnetically operated control mechanism by means of which a driven shaft may be connected to and disconnected from a driving shaft, and whereby such changes of coupling connection may be effected in very rapid succession, and a reliable and effective coupling action secured.

A further object of my invention is to provide a mechanism by means of which rotary motion may be selectively imparted from a driving shaft to a driven shaft in a desired sense of rotation, and whereby rapid changes of such coupling connections may be carried out.

These and other objects of my invention will become more clear by the following detailed description taken with reference to the accompanying drawings, which are subject to modification as coming within the scope of the invention embraced by the appended claims. In the drawings, Fig. 1 is a front view shown partly in cross section of a device constituting a practical embodiment of the invention, Fig. 2 is a cross section of the device shown in Fig. 1, taken along lines A—B, Fig. 3 is a further cross section taken along lines C—D of the device shown in Fig. 1, and Fig. 4 shows a wiring diagram of connections of the electro-magnetic controlling windings as provided for the coupling device shown by Figs. 1 and 3.

Similar reference characters refer to similar elements throughout the drawings.

With quick acting mechanisms such as for instance switching apparatus of automatic machine switching telephone systems, it is required that a rapid and effective mechanical coupling connection takes place. In order to secure such quick acting operation it is necessary to avoid the influence of inertia phenomena of the magnetic as well as of the mechanical elements used for control purposes. The electro-mechanical coupling device according to my invention is specifically intended to suppress or minimize to a practically sufficient degree the effects of the magnetic inertia of the self-inductance of the control magnet coils and of the mechanical inertia of the coupling members operated by a control magnet armature. Besides, in order to secure effective coupling connection of the driving and the driven members each of the latter is provided with a surface, one of which is provided with a number of holes and the other with a corresponding number of steel balls inserted in and projecting from the surface, which by engaging with the mentioned holes in the coupled state secure an effective coupling connection between both rotating members.

Referring to the drawings, $h$ and $i$ are shifting levers or arms pivotally arranged by a connecting axis $a$; $b$ and $c$ are armatures of soft iron arranged between arms $i$ and $h$ and placed each within the middle coil $2$—$2'$ and $5$—$5'$ respectively of iron frames having outer legs $d$, $e$ respectively $f$, $g$, these frames being arranged perpendicularly to the plane formed by the shifting arms $i$ and $h$. The magnet coils of the armatures $b$, $c$ have a central opening such as to allow a swinging motion of the frame $i$, $h$ in respect to its axis $a$. The one extremity $w$ of the shifting levers $i$ or $h$ engages with a coupling member $k$ consisting of a sleeve slidably keyed to the shaft $l$ and having flanges $x$ at its both sides. These latter are provided with holes $y$ arranged along a circumferential line which engage with corresponding steel balls $m$ inserted in extension flanges of beveled gears $n$ and $q$ respectively in case the coupling member $k$ is shifted to one or the other side in accordance with the movement of the controlling levers $h$, $i$. Both bevel gears $n$ and $q$ are loosely arranged on the shaft $l$ and are in engagement each at one side with a further common beveled gear $o$, which latter is fixedly arranged on another shaft $p$ perpendicular to the shaft $l$. This shaft $p$ may for instance be a driving shaft, and $l$ the driven shaft to which a motion is to be transferred in one or the other direction. However, the same considerations hold if in a reverse sense shaft $l$ is regarded as the driving shaft and $p$ the driven shaft to which motion in a desired sense is to be imparted. Items $s$ and $t$ are levers pivotally arranged at their outer ends and each of these levers has at its inner end a curved extension pressed against a bar $r$ adjoining the shifting levers $h$ and $i$ by means of a spring $z$; $u$ and $v$ are locking rods or pawls fixed on the levers $s$ and $t$ respectively and engaging with ratchet teeth provided on the circumference of the flanges of coupling member $k$. The function of the levers $s$ and $t$ is to maintain the coupling member $k$ normally locked against rotation. Whenever the shifting levers $h$ and $i$ are rocked in a clockwise or counterclockwise direction about their pivot $a$ for the purpose of effecting coupling connection, as will be described hereinafter, the bar $r$, by reason of its engagement with the curved extensions of the levers $s$ and $t$, presses both of these levers down against the tension of their springs $z$ and disengages the pawls $u$ and $v$ from the co-operating ratchet teeth so that the coupling member $k$ is then free to rotate. When the levers $h$ and $i$ return to their normal position, as shown in Figure 1, the levers $s$ and $t$ are permitted to return to their normal position under the force of their springs $z$ and the pawls $u$ and $v$ engage the teeth of the coupling member $k$ to lock the coupling member against further rotation. The iron cores $d, e, f, g$ are each provided with an electric winding 1, 3, 4, 6 respectively and the middle coils surrounding the armatures $b$ and $c$ are provided with two windings each, 2—2' and 5—5' respectively, as referred to above. Coils 1, 3, 4, 6, may be connected in series with an electric battery B and with either coils 2—5 or coils 2'—5' by means of a controlling switch $sw$ as seen from the diagram of connections according to Fig. 4.

The operation of the coupling device as described takes place as follows:—

The sense of the windings of the coils 1 to 6 in respect to each other is made such that when excited by the current of the battery B both armatures $b$ and $c$ are partly attracted and partly rejected by the iron cores $d, e,$ and $f, g$ respectively. For this purpose the current exciting the outside coils 1, 4, 3, 6 is at the same time flowing through one of the windings of armatures $c,$ and $d,$ namely, either through 2 and 5 or 2' and 5'. Thus a mechanical force is exerted at both sides of the pivot point of the shifting levers $i$ and $h$ (in one or the other direction) depending on which of the coils 2 or 2' respectively 5 or 5' is switched in circuit with battery B. This insures a rather quick and effective coupling operation without any practically perceptible inertia action. The shifting levers $h$ and $i$ take part of this motion of the armatures $b$, $c$ and shift the coupling member $k$ to one or the other side, bringing the steel balls $m$ into engagement with the holes $y$, whereby rotation in one or the other sense is imparted from one shaft to the other. When the coupling connection is to be removed, switch $sw$ is put into its open position whereby the magnetic fields disappear and the shifting levers $h$ and $i$ return to their zero position, as may readily be understood. The locking pawls $u$ and $v$ which during the coupled condition have been disengaged from the ratchet teeth of the flanges of the coupling member $k$ are again brought into engagement and thus secure instantaneous stopping action of the driven shaft $l$. As pointed out, the rotation may be imparted from shaft $p$ to shaft $l$ in one or the other sense, as desired, by shifting the switch $sw$ to its left or its right position whereby the polarity of the armatures $b$ and $c$ as seen in Fig. 3 is reversed and the magnetic forces will act on the armatures in opposite sense. For this purpose, coils 2' and 5' arranged on the armature $b$ and $c$ in the same manner as the coils 2 and 5 are wound in a reverse sense with respect to the latter. Coils 1 and 3 are also wound in reverse sense with respect to coils 4 and 6 to produce a magnetic flux in an opposite sense in both of the magnetic iron paths constituted by the iron cores $d, e$ and $f, g$ respectively, such as is seen from Fig. 1, whereby a mechanical torque as desired in the same sense is exerted on the shifting levers $h$ and $i$ at both sides of their pivot axis.

It may be understood that my invention such as described in connection with the specific embodiment shown in the drawings is subject to many modifications. For instance, it may be required that rotating motion from one shaft to another is to be transferred only in a single pre-determined direction, whereby one of the beveled gears associated with one of the shafts may be omitted, as will be readily understood, the chief object and the special feature of my invention being the use of special magnetic and mechanical elements as set forth to secure a practically instantaneous coupling action and to make it possible to change the coupling connection in very rapid succession.

Having described my invention, what I believe to be new and desire to secure and protect by Letters Patent of the United States is:—

1. In combination, a first shaft, a second shaft, coupling gears connected to said shafts, a shifting member pivotally arranged to effect coupling connection for imparting rotating motion from one to the other of said shafts, and electro-magnetically operated control means exerting a mechanical torque on said shifting member on both sides of its pivot point.

2. In combination, a first shaft, a second shaft, co-operating beveled gears connected to said shafts, a shifting means pivotally arranged to bring said shafts into and out of coupling engagement and electro-magnetically operated control means exerting a mechanical torque on said shifting means on both sides of its pivot point.

3. In combination, a first shaft, a second shaft arranged at an angle with said first shaft, a driving beveled gear connected fixedly to one of said shafts, another beveled gear connected loosely to the other of said shafts, and driven by the first beveled gear, means for effecting and removing coupling connection of said shafts comprising a coupling element slidably keyed to said second shaft and adapted to be brought into coupling engagement with said beveled gear on said second shaft, a shifting member pivotally arranged to move said coupling member into and out of engagement with said second beveled gear, and electro-magnetically operated control means for said shifting member exerting a mechanical torque on said shifting member on both sides of its pivot point.

4. In combination, a first shaft, a second shaft arranged at right angles to said first shaft, a beveled gear fixedly connected to one of said shafts, another beveled gear connected loosely to the other of said shafts and constantly driven by said first beveled gear, means for effecting and removing coupling connection of said shafts, comprising a coupling element slidably keyed to said second shaft to be brought into coupling engagement with said bevelled gear connected to said second shaft, a shifting member pivotally arranged to move said coupling member into and out of its coupling position, and electro-magnetically operated control means for said shifting member exerting a mechanical torque on both sides of its pivot point.

5. In combination, a first shaft, a second shaft arranged at an angle with said first shaft, a driving beveled gear connected fixedly to one of said shafts, another beveled gear connected loosely to the other of said shafts and driven by the first beveled gear, means for effecting and removing coupling connections of said shafts comprising a coupling element provided with a number of holes and slidably keyed to said second shaft and adapted to be brought into coupling engagement with said beveled gear on said second shaft, a shifting member pivotally arranged to move said coupling member into and out of engagement with said second beveled gear, said latter being provided with ball shaped coupling members inserted in one of its surfaces and engaging with said holes of said coupling member, and electro-magnetically operated control means for said shifting member exerting a mechanical torque on said shifting member on both sides of its pivot point.

6. In combination, a first shaft, a second shaft arranged at right angles to said first shaft, a beveled gear fixedly connected to one of said shafts, another beveled gear connected loosely to the other of said shafts and constantly driven by said first beveled gear, means for effecting and removing coupling connection of said shafts, comprising a coupling element provided with a number of holes and slidably keyed to said second shaft to be brought into coupling engagement with said beveled gear connected to said second shaft, a shifting member pivotally arranged to move said coupling member into and out of its coupling position, said latter being provided with ball shaped coupling members inserted in one of its surfaces and engaging with said holes of said coupling member, and electro-magnetically operated control means for said shifting member exerting a mechanical torque on both sides of its pivot point.

7. In combination, a first shaft, a second shaft arranged at right angles to said first shaft, a beveled gear fixedly connected to said first shaft, another beveled gear connected loosely to said second shaft and constantly driven by said first beveled gear, means for effecting and removing coupling connection of said shafts, comprising a coupling element consisting of a sleeve slidably keyed to said second shaft and provided with a flange having a number of holes circumferentially arranged, steel balls being inserted in a circumferential position on one surface of said second beveled gear and adapted to engage with said holes upon shifting said coupling member in its coupling position, a shifting member pivotally arranged to move said coupling member into and out of its position of engagement with said beveled gear for effecting mechanical coupling connection between said shafts, and electro-magnetically controlled means for said shifting member exerting a mechanical torque at both sides of its pivot point.

8. In combination, a first shaft, a second shaft arranged at right angles to said first shaft, a beveled gear fixedly connected to one of said shafts, another beveled gear connected loosely to the other of said shafts and constantly driven by said first beveled gear, means for effecting and removing coupling connection of said shafts, comprising a coupling element slidably keyed to said second shaft to be brought into coupling engagement with said beveled gear connected to said second shaft, a shifting member pivotally arranged to move said coupling member into and out of its coupling position, means to produce a magnetic circuit including an air gap, means to produce a further magnetic circuit including an air gap, both magnetic circuits beng arranged at one side each of the pivot point of said shifting member, and armature iron cores for said shifting member arranged each at one side of its pivot point within one of said air gaps and surrounded by electric magnetizing coils to effect a mechanical torque on both sides of the pivot point of said shifting member.

9. In combination, a first shaft, a second shaft arranged at an angle with said first shaft, a driving beveled gear connected fixedly to one of said shafts, another beveled gear connected loosely to the other of said shafts and driven by the first beveled gear, means for effecting and removing coupling connections of said shafts comprising a coupling element provided with a number of holes and slidably keyed to said second shaft and adapted to be brought into coupling engagement with said beveled gear on said second shaft, a shifting member pivotally arranged to move said coupling member into and out of engagement with said second beveled gear, said latter being provided with ball shaped coupling members inserted in one of its surfaces and engaging with said holes of said coupling member, means to produce a magnetic circuit including an air gap, means to produce a further magnetic circuit including an air gap, both magnetic circuits being arranged at one side each of the pivot point of said shifting member, and armature iron cores for said shifting member arranged each at one side of its pivot point within one of said air gaps and surrounded by electric magnetizing coils to effect a mechanical torque on both sides of the pivot point of said shifting member.

10. In combination, a first shaft, a second shaft arranged at right angles to said first shaft, a beveled gear fixedly connected to one of said shafts, another beveled gear connected loosely to the other of said shafts and constantly driven by said first beveled gear, means for effecting and removing coupling connection of said shafts, comprising a coupling element slidably keyed to said second shaft to be brought into coupling engagement with said beveled gear connected to said second shaft, a shifting member pivotally arranged to move said coupling member into and out of its coupling position, means to produce a magnetic circuit including an air gap, means to produce a further magnetic circuit including an air gap, both magnetic circuits being arranged at one side each of the pivot point of said shifting member, armature iron cores for said shifting member arranged each at one side of its pivot point within one of said air gaps and surrounded by electric magnetizing coils to effect a mechanical torque on both sides of the pivot point of said shifting member, and means operated by said shifting member to stop the driven shaft instantaneously upon disconnection from the driving shaft.

11. In combination, a first shaft, a second shaft arranged at an angle with said first shaft, a driving beveled gear connected fixedly to one of said shafts, another beveled gear connected loosely to the other of said shafts and driven by the first beveled gear, means for effecting and removing coupling connections of said shafts comprising a coupling element provided with a number of holes and slidably keyed to said second shaft and adapted to be brought into coupling engagement with said beveled gear on said second shaft, a shifting member pivotally arranged to move said coupling member into and out of engagement with said second beveled gear, said latter provided with ball shaped coupling members inserted in one of its surfaces and engaging with said holes of said coupling member, means to produce a magnetic circuit including an air gap, means to produce a further magnetic circuit including an air gap, both magnetic circuits being arranged at one side each of the pivot point of said shifting member, armature iron cores for said shifting member arranged each at one side of its pivot point within one of said air gaps and surrounded by electric magnetizing coils to effect a mechanical torque on both sides of the pivot point of said shifting member.

12. In combination, a first shaft, a second shaft arranged at right angles to said first shaft, a beveled gear fixedly connected to said first shaft, a couple of further beveled gears connected loosely to said second shaft at one side each of said first beveled gear and constantly driven therefrom, means for effecting and removing coupling connection in a desired sense of said shafts comprising a coupling element between said two second beveled gears slidably keyed to said second shaft and provided with a number of holes, said coupling element being adapted for being brought into engagement with a coupling surface of said second beveled gears having coupling steel balls inserted engaging with said holes, a shifting member pivotally arranged for said coupling member, and reversible electro-magnetically operated control means for said shifting means exerting a mechanical torque on both sides of its pivot point.

13. In combination, a first shaft, a second shaft arranged at right angles to said first shaft, a beveled gear fixedly connected to said first shaft, a couple of further beveled gears connected loosely to said second shaft at one side each of said first beveled gear and constantly driven therefrom, means for effecting and removing coupling connection in a desired sense of said shafts comprising a coupling element between said two second beveled gears slidably keyed to said second shaft and provided with a number of holes, said coupling element being adapted for being brought into engagement with a coupling surface of said second beveled gears having coupling steel balls inserted engaging with said holes, a shifting member pivotally arranged for said coupling member, means to produce a magnetic circuit including an air gap, means to produce a further magnetic circuit including an air gap, both magnetic circuits being arranged at one side each of the pivot point of said shifting member, and armature iron cores for said shifting member arranged each at one side of its pivot point within one of said air gaps and surrounded by electric magnetizing coils to effect a mechanical torque on both sides of the pivot point of said shifting member.

14. In combination, a first shaft, a second shaft arranged at right angles to said first shaft, a beveled gear fixedly connected to said first shaft, a couple of further beveled gears connected loosely to said second shaft at one side each of said first beveled gear and constantly driven therefrom, means for effecting and removing coupling connection in a desired sense of said shafts comprising a coupling element between said two second beveled gears slidably keyed to said second shaft and provided with a number of holes, said coupling element being adapted for being brought into engagement with a coupling surface of said second beveled gears having coupling steel balls inserted engaging with said holes, a shifting member pivotally arranged for said coupling member, means to produce a magnetic circuit including an air gap, means to produce a further magnetic circuit including an air gap, both magnetic circuits being arranged at one side each of the pivot point of said shifting member, armature iron cores for said shifting member arranged each at one side of its pivot point within one of said air gaps and surrounded by electric magnetizing coils to effect a mechanical torque on both sides of the pivot point of said shifting member, and means to revert the magnetic force of said armature cores to exert a mechanical torque on said shifting member in one or the other sense.

In testimony whereof I have affixed my signature.

RICHARD KEMLEIN.